United States Patent
Concha et al.

(10) Patent No.: US 9,535,679 B2
(45) Date of Patent: Jan. 3, 2017

(54) DYNAMICALLY OPTIMIZING APPLICATIONS WITHIN A DEPLOYMENT SERVER

(75) Inventors: Fernando Concha, Coral Springs, FL (US); David E. Reich, Jupiter, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1277 days.

(21) Appl. No.: 11/023,855

(22) Filed: Dec. 28, 2004

(65) Prior Publication Data

US 2006/0143601 A1    Jun. 29, 2006

(51) Int. Cl.
G06F 9/45     (2006.01)
G06F 9/445    (2006.01)

(52) U.S. Cl.
CPC .. *G06F 8/64* (2013.01); *G06F 8/61* (2013.01)

(58) Field of Classification Search
CPC ..................................... G06F 8/61; G06F 8/64
USPC ......... 717/167, 146–148, 151–157, 174–178
See application file for complete search history.

(56) References Cited

U.S. PATENT DOCUMENTS

| | | | |
|---|---|---|---|
| 5,966,702 A * | 10/1999 | Fresko et al. | |
| 2002/0049858 A1* | 4/2002 | Frietas et al. | 709/246 |
| 2002/0066088 A1* | 5/2002 | Canut et al. | 717/151 |
| 2002/0138825 A1* | 9/2002 | Heeb | 717/148 |
| 2003/0023953 A1* | 1/2003 | Lucassen et al. | 717/106 |
| 2003/0084156 A1 | 5/2003 | Graupner et al. | |
| 2003/0084165 A1 | 5/2003 | Kjellberg et al. | |
| 2003/0105888 A1* | 6/2003 | Connelly et al. | 709/331 |
| 2003/0120780 A1 | 6/2003 | Zhu et al. | |
| 2003/0135851 A1* | 7/2003 | Dickey et al. | 717/168 |
| 2003/0158894 A1 | 8/2003 | Ziserman | |
| 2004/0003029 A1 | 1/2004 | Islam et al. | |
| 2004/0015811 A1* | 1/2004 | Freitas et al. | 717/100 |
| 2004/0098715 A1* | 5/2004 | Aghera et al. | 717/173 |
| 2004/0117779 A1 | 6/2004 | Lagergren | |
| 2004/0143823 A1 | 7/2004 | Wei | |
| 2004/0181779 A1* | 9/2004 | Gorti | 717/120 |
| 2004/0194083 A1* | 9/2004 | Hindle et al. | 717/174 |

(Continued)

OTHER PUBLICATIONS

Steve Teixeira; Xavier Pacheco, "Borland® Delphi™ 6 Developer's Guide", Dec. 17, 2001, Sams Publishing, 3 pages.*

*Primary Examiner* — James D Rutten
(74) *Attorney, Agent, or Firm* — The Steadman Law Firm PLLC

(57) ABSTRACT

A deployment server can include a profile data store, a generic application data store, and an optimizer. The profile data store can contain a plurality of attributes for devices and associate different optimization parameters or optimization routines to each of the stored attributes. The generic application data store can contain at least one generic application written in a device independent fashion. The optimizer can receive application requests from an assortment of different requesting devices and can dynamically generate device-specific applications responsive to received requests. For each requesting device, the optimizer can determine attributes of a requesting device, utilize the profile data store to identify optimization parameters or optimization routines for the requesting device, and generate a device-specific application based upon data from the profile data store and based upon a generic application retrieved from the generic application data store.

19 Claims, 2 Drawing Sheets

(56) References Cited

U.S. PATENT DOCUMENTS

2004/0230950 A1\* 11/2004 Bedner et al. ............... 717/118
2005/0022182 A1\* 1/2005 Mittal ........................... 717/178
2006/0015865 A1\* 1/2006 Schneider et al. ........... 717/174

\* cited by examiner

DYNAMICALLY OPTIMIZING APPLICATIONS WITHIN A DEPLOYMENT SERVER

BACKGROUND

Field of the Invention

The present invention relates to real-time software deployment and, more particularly, to a technique for dynamically optimizing applications for a target system within a deployment server.

Description of the Related Art

The innovation of platform independent software languages, such as the JAVA programming language from Sun Microsystems of Santa Clara, Calif., represents a significant technological advance, which permits software to be written in a platform independent language, which we will call a Write Once, Run Anywhere (WORA) language. Platform independent languages can reduce software development time and system maintenance time since only one version of a software application needs to be developed and maintained, can alleviate many "lock-in" situations, and can generally allow Web deployment of applications to occur in a platform agnostic manner. Currently, however, optimizations are often needed and/or desired in system and application programs to improve performance and minimize the resources consumed by platform agnostic software. These optimizations can be particularly important in systems where memory and computing resources are at a premium, which is the situation for many mobile computing devices, pervasive computing systems, embedded computing systems, and the like. Illustrative resource conserving optimizations can include, for example, removing of unused classes from packages, performing ahead of time (AOT) compilations, removing or modifying code paths, optimizing memory usage in an application, and the like.

In certain situations, optimizations and device-specific customizations become more than just a luxury, providing a necessary precursor before generic software can operate upon a device. It should be appreciated that the types and purposes of devices in the world wide market are extremely fragmented and heterogeneous. That is, even if a software developer utilizes a WORA language to construct software, device specifics can often cause the resulting applications to run poorly or even malfunction. For example, even though a Personal Data Assistant (PDA) can execute JAVA code, memory or processor limitations of the PDA can result in runtime errors during code execution.

Rapid technological advances in hardware have intensified the problems inherent in a market of heterogeneous devices. Because of market pressure and rapid advances, the same manufacturer can support multiple configurations of equivalent devices or a device line, each having different memory and processor specifications. Even more problematic, different manufacturers for the same device type can utilize divergent technologies within approximately equivalent devices. As a result, device hardware and configuration differences within the commercial market can be relatively extreme, thereby negatively affecting the viability of platform independent software.

Drawbacks exist with existing solutions to implementing software within a heterogeneous device space. A rudimentary solution is to customize and optimize software on a per-device basis during the design stage of a software development lifecycle. This solution, however, can be expensive and largely defeats the gains achieved through WORA technologies. Further, as new devices are created, new versions and/or optimizations of the software for the new devices are required, which results in a continuous cost for supporting and maintaining a software application.

Another solution is to perform adaptive optimizations within a run-time compiler of an application. Such a solution can gather feedback information during application execution, can convey the feedback to the compiler, and can re-compile the code in accordance to the feedback. A drawback is that a significant amount of monitoring overhead is needed to operationally capture the feedback and to continuously recompile code. The level of overhead can exceed performance gains resulting from the solution. Further, resource-constrained devices often do not have enough allocable resources to execute the base code, let alone the additional overhead code required for adaptive optimizations of this base code within a client.

Still another solution to deploying code across a diverse base is to establish a client-server relationship, where a portion of execution occurs at a server. Different clients can be developed for different devices, each client being capable of operating within the resource constraints of its host device. Client-server systems can be further enhanced to include load balancing systems, content caching, parallel computations, redundant servers, and other networking techniques for smoothing out bottleneck and communication interruptions common within a client-server architecture. While this solution can alleviate some of the concerns with a resource-constrained device, it fails to address the underlying problems of a divergent device space. Further, the solution requires a relatively constant communication link between a client and server, which can be costly and/or disadvantageous in many situations. Moreover, a client-server solution can still require different clients for different devices to be constructed, where the construction of the different clients involves the aforementioned problems, which are not adequately addressed by existing technologies.

Yet another type of adaptive device solution addresses presentation and input problems through transcoding. For example, mobile devices often have smaller screens and different default input modes (such as speech recognized input or handwriting recognized input as opposed to keyboard input) from less constrained devices. Transcoding attempts to modify the input and output designed for one type of device to the characteristic of a different type of device so that, for example, Web pages designed for desktop browsers can be intelligibly presented within Web-enabled PDA devices. Transcoding solutions address input/output deltas among divergent devices and do not optimize code for a target platform, so as to minimize resource consumptions. Accordingly, transcoding is a complementary solution to that presented herein and does not otherwise relate to the present invention.

SUMMARY OF THE INVENTION

The present invention details a system, a method, and an apparatus for dynamically optimizing applications for a target system within a deployment server. The invention can be utilized within an on-demand environment, where a client can request an application or application portion from a server, which responsively provides the requested application. For example, the JAVA RUNTIME ENVIRONMENT (JRE) is one example of such an on-demand environment, although the invention is not to be limited in this regard.

In accordance with the invention, a version of an application that is not optimized for a specific device or platform called a generic application can be developed and deployed within a deployment server. The deployment server can include a plurality of device profiles that define the attributes of devices that can request application delivery. Devices having an associated profile can submit application requests to the deployment server, which can use the profiles to dynamically optimize the generic application for the requesting device. When so indicated by the profile, the deployment server can package the delivered application along with suitable runtime execution libraries and routines in an appropriate format for a receiving device.

The present invention can be expressed in various aspects and embodiments and can be construed as having a scope which is defined by the claim section included herein. In accordance with one aspect of the present invention, a deployment server can include a profile data store, a generic application data store, and an optimizer. The profile data store can contain a plurality of attributes for devices and associate different optimization parameters or optimization routines to each of the stored attributes. The generic application data store can contain at least one generic application written in a device-independent fashion. The optimizer can receive application requests from an assortment of different requesting devices and can dynamically generate device-specific applications responsive to received requests. For each requesting device, the optimizer can determine attributes of a requesting device, utilize the profile data store to identify optimization parameters or optimization routines for the requesting device, and generate a device-specific application based upon data from the profile data store and based upon a generic application retrieved from the generic application data store.

Another aspect of the present invention can include a computerized method for optimizing applications. The method can include the step of receiving a request from a client for an application. The method can match the client with at least one previously stored profile, can determine attributes specific to the client based upon the profile, and can dynamically generate a client-optimized application based upon the determined attributes and a generic version of the application. The client-optimized application can be conveyed to the client.

It should be noted that the invention can be implemented as a program for a controlling computer to implement the functions described herein, or as a program for enabling a computer to perform the process corresponding to the steps disclosed herein. This program may be provided by storing the program in a magnetic disk, an optical disk, a semiconductor memory, any other recording medium, or distributed via a network.

BRIEF DESCRIPTION OF THE DRAWINGS

There are shown in the drawings, embodiments which are presently preferred, it being understood, however, that the invention is not limited to the precise arrangements and instrumentalities shown herein.

DETAILED DESCRIPTION OF THE INVENTION

Figure 1:
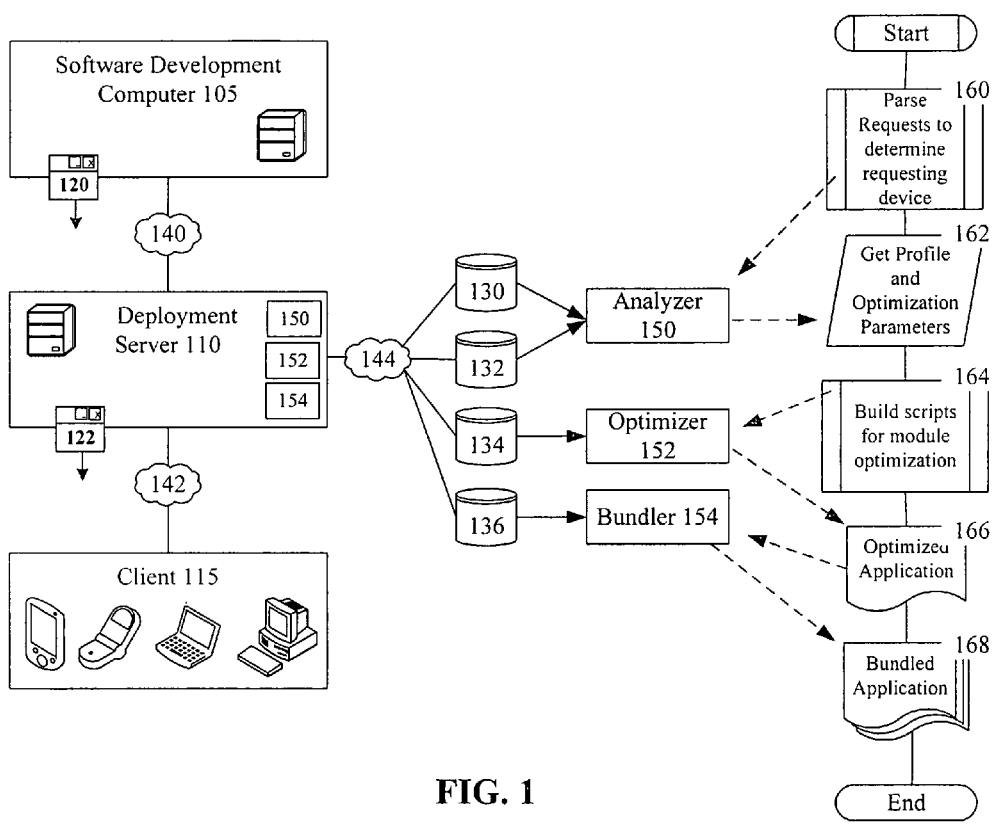
FIG. 1 is a schematic diagram illustrating a system for deploying applications optimized for target clients in accordance with an embodiment of the inventive arrangements disclosed herein.

FIG. 1 is a schematic diagram illustrating a system 100 for deploying applications optimized for target clients in accordance with an embodiment of the inventive arrangements disclosed herein. In system 100, a generic application 120 can be developed within a software development computer 105. The generic application 120 is any application that is not optimized for a particular client 115. In one embodiment, the generic application 120 can be written in a platform independent fashion so as to maximize the number of systems in which the generic application 120 can be deployed. For example, the generic application 120 can be written in the JAVA programming language or any other platform independent language.

After development, the generic application 120 can be conveyed across network 140 to a deployment server 110, which can be configured to deploy applications and/or application components responsive to client 115 requests. When the client 115 requests an application, the deployment server 110 can determine a previously stored generic application 120 that corresponds to the request, can determine client 115 capabilities, and can responsively generate a client-optimized application 122. The generated client-optimized application 122 can be conveyed to the requesting client 115 via network 142. Consequently, software developers can focus upon writing device-independent software and software customers can receive software tailored for their individual devices.

The software development server 105 can represent any computer or network of communicatively linked, interoperating computing devices used within a software development environment to design, construct, test, maintain, and/or administer generic application 120.

The client 115 can include machine-readable code executing upon a host device that is capable of requesting an application from the deployment server 110, receiving the application 122, and executing the application 122. The client 115 can operate in an autonomous fashion when executing the application 122 or can require operational communication exchanges with one or more remotely located servers when executing application 122.

The client 115 is not to be limited to any particular type of software hosted upon a particular device, but is intended to be construed broadly to include a vast array of potential clients hosted by diverse devices in a fragmented and heterogeneous device space. Devices upon which the client 115 can reside can include, but are not limited to, embedded devices, pervasive computing devices, mobile devices, desktop computing devices, notebook computing devices, and the like. For example, a device hosting client 115 can be a resource-constrained device such as a Personal Data Assistant (PDA), a mobile telephone, a tablet computer, a set-top box, a vehicle-embedded device, and/or an ubiquitous computing device. In another example, the hosting device can include such traditional computing devices as a desktop computer, a notebook computer, or an intranet server. The device hosting client 115 can be a physical device or a software defined virtual device. The device can consist of geographically localized hardware as well as distributed networked elements.

Similarly, the deployment server 110 can be formed from centralized or distributed components that interoperate in such a fashion that the client-optimized application 122 can be generated and conveyed to the client 115. In one embodiment, the deployment server 110 can be a component of an integrated development environment for creating, testing, and deploying e-business applications to mobile and wireless devices. In such an embodiment, the deployment server 110 can utilize commercially available tools such as MICROANALYZER and SMARTLINKER, which are components of WEBSPHERE STUDIO DEVICE DEVELOPER (WSDD) from International Business Machine Corporation (IBM) of Armonk, N.Y. The deployment server 110 is not limited in this regard, however, can be implemented using a variety of methodologies and components, as should be easily appreciated by those skilled in the art, as many deployment server technologies exist within the field of computer science which can be used in conjunction with the inventive arrangements detailed herein.

The deployment server 110 can generate the client-optimized application 122 for a multitude of defined client configurations upon receiving the generic application 120, can dynamically generate the client-optimized application 122 upon receiving client requests, or combinations of the two. For example, the deployment server 110 can generate client optimized applications 122 for popular client configurations whenever resources permit in anticipation of requests and can dynamically generate less popular optimizations on demand. In another example, the deployment server 110 can execute optimization scripts in an iterative fashion so that some optimizations needed to generate an optimized application 122 from a generic application 120 are performed before requests are received and other optimizations are performed after the requests are received.

The deployment server 110 can include an analyzer 150, an optimizer 152, and a bundler 154 and can utilize information maintained within profile store 130, parameter store 132, generic application store 134, and library store 136. Each data store 130, 132, 134, and 136 can be local stores of the deployment server 110 or can be remotely located stores accessible via network 144.

The profile data 130 can store a plurality of attributes for devices and can associate different optimization parameters or optimization routines to each of the stored attributes. The parameter store 132 can store client-specific parameters, optimizer-specific parameters, and scripts used within the optimization process. The generic application data store 134 can store a plurality of generic applications 120, client-optimized applications 122 constructed ahead of time (before requests are received), and partial optimizations of generic applications 120 used in constructing client-optimized applications 122. The library store 136 can include runtime libraries, modules, dependency tables, and the like that can be used to ensure clients are conveyed any and all software routines needed for the client-optimized application 122 to run upon the client 115.

The analyzer 150 can dynamically analyze the capabilities of a device upon which client 115 resides. These capabilities can be translated into one or more attributes, which can adhere to a defined standard. Thus, even though different clients 115 can define their capabilities in a client-specific or device-specific manner, device profiles can be stored in accordance with standardized terminology, referred to as client attributes. For example, different central processing unit (CPU) manufacturers use different frames of reference to define CPU capabilities. Different optimization scripts and parameters can relate to different attributes, the relationships being specified within tables or files of the parameter store 132.

The optimizer 152 can receive application requests from an assortment of different clients 115 and can generate the client optimized application 122 using information within the profile store 130, the parameter store 132, and the generic application store 134. For example, the optimizer 152 can remove unneeded classes, methods, and fields from the generic application 120 when generating the client-optimized application 122. In one embodiment, the optimizer 152 can include the SMARTLINKER form IBM or similar software provided by other venders.

The bundler 154 can identify machine-readable code that is to be bundled with the device-specific application in order for the client-optimized application 122 to be executable upon the device hosting the client 115. The bundler 154 upon identifying necessary libraries and software routines can retrieve the routines from the library store 136, and can bundle the identified machine-readable code with the client-optimized application 122. The bundler 154 can further adhere to any formatting restriction imposed by the client 115. For example, the bundler 154 can group software within a client-specific format, such as the JAVA ARCHIVE (JAR) format as appropriate. Client specific formatting and software configurations can be determined by interrogating the client 115 directly, can be parsed from the application request from the client 115, or can be determined from profile data stored within profile store 130.

To illustrate system 100 in operation, client 115 can issue requests, which are parsed in process 160. Parsing a request can determine specifics of the requesting device hosting client 115. Client specifics can also be determined using analyzer 150 and information within profile store 130 and parameter store 132. Consequently, as shown by process 162, profile and optimization parameters can be determined. In process 164, scripts can be built that are used by the optimizer 152. The optimizer 152 can run these scripts against files contained within the generic application data store 134 to ultimately generate an optimized application in accordance with the client-specific parameters.

In one embodiment, the scripts can be built and executed in a modular or stepwise fashion. Thus, the optimization process can occur as a series of discrete steps. Alternatively, the optimization process can consist of a single step that directly generates the client-optimized application 122. Either way, as shown in process 166, the optimizer can produce an optimized application. In process 168, the optimized application can be conveyed to bundler 154 so that all necessary routines and libraries from the library store 136 can be grouped with the optimized application and appropriately formatted to create the client-optimized application 122 that is delivered to client 115.

It should be noted that networks 140, 142, and 144 can be implemented in any of a variety of fashions so long as content is conveyed using encoded electromagnetic signals. Further, any of a variety of communication devices, such as customer premise equipment (CPE), computers, modems, routers, switches, access points, or the like, can be included within networks 140, 142, and 144.

Each of the networks 140, 142, and 144 can convey content in a packet-based or circuit-based manner. Additionally, each of the networks 140, 142, and 144 can convey content via landlines or wireless data communication methods. For example, each of the networks 140, 142, and 144 can separately include an Intranet, a local area network, a wide area network, or a combination thereof. In another example, each of the networks 140, 142, and 144 can include a telephony network, such as a mobile wireless network or a public switched telephone network (PSTN).

The data stores 130, 132, and 134 can store information in any recording medium, such as a magnetic disk, an optical disk, a semiconductor memory, or the like. Further, each of the data stores 130, 132, and 134 can utilize any information retention technique including a file-based storage technique or a database storage technique. Moreover, each of the data stores 130, 132, and 134 can be a storage area fixed to a geographical location or a storage area distributed across a network space. Additionally, each of the data stores 130, 132, and 134 can represent a persistent memory region, such as hard drive memory space, as well as a volatile memory region, such as a random access memory (RAM) memory space.

It should be appreciated that the arrangements shown in FIG. 1 are for illustrative purposes only and that the invention is not limited in this regard. The functionality attributable to the various components can be combined or separated in different manners than those illustrated herein. For instance, data stores 130, 132, and 134 can be implemented as a single data store. In another embodiment of the present invention, the software development computer 105 and the deployment server 110 can be implemented within a single software development and deployment server.

Figure 2:
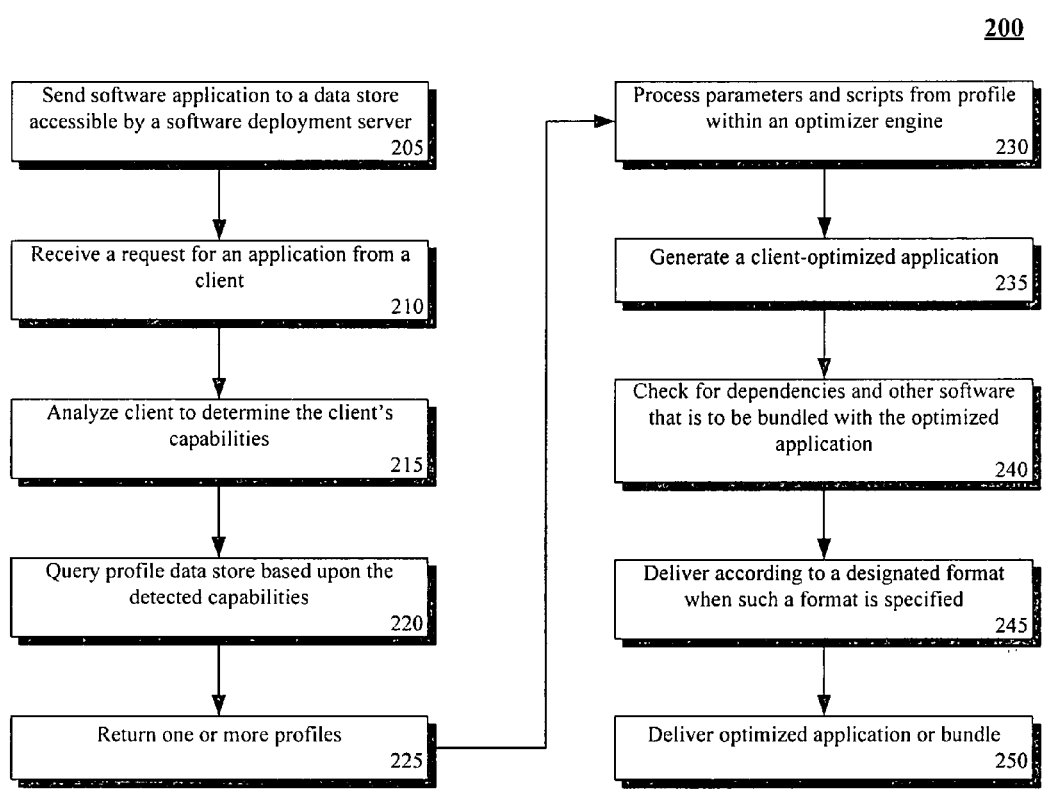
FIG. 2 is a flow chart illustrating a method of optimizing applications in accordance with an embodiment of the inventive arrangements disclosed herein.

FIG. 2 is a flow chart illustrating a method 200 of optimizing applications in accordance with an embodiment of the inventive arrangements disclosed herein. The method 200 can be performed in the context of any application deployment environment where applications are deployable to clients upon demand. Optimization can occur at the deployment stage and can occur within a deployment server. For example, the method 200 can be performed within the context of an integrated development environment for creating, testing, and deploying e-business applications to mobile and wireless devices, such as the WebSphere Studio Device Developer (WSDD). In one contemplated arrangement, the method 200 can be implemented within system 100 or other such system.

The method 200 can begin in step 205, where a software application written within a software development environment can be sent to a software deployment server. In one embodiment, the software application can be written in a platform agnostic manner and language. For example, the software application can be written in the JAVA programming language or any other Write Once, Run Anywhere (WORA) language. The version of the software from the development environment can be a generic version that has not been optimized for any particular device or platform. In step 210, a request for an application can be received from a client. In step 215, the client can be analyzed to determine the capabilities of the client. For example, an analysis program such as MicroAnalyzer from IBM can be used to dynamically perform an analysis on demand. In another example, the client can register with the deployment server, at which time information about the capabilities can be received and stored to be used when needed.

In step 220, a profile data store can be queried based upon client identity and/or determined client capabilities. In step 225, the query can return one or more profiles. Each profile can be associated with parameters and scripts. Scripts can also be dynamically generated for a particular client or application based upon one or more generic scripts that are selected and/or modified for information specific to a client, device, profile, application, and combinations thereof. In step 230, the parameters and scripts can be processed by an optimizer engine or by one or more optimizing routines. In step 235, the processing can result in an a client-optimized application.

For example, in one embodiment, the client-optimized application can be a version of the generic application with unused classes removed from packages and with application processing specifics tailored to the memory and processing capabilities of the client. The client-optimized application can also utilize ahead of time (AOT) and inline compile techniques. For example, when the generic application is written in a JAVA programming language, the client-optimized application can include pre-verified bytecode executables constructed at link time.

In step 240, the method can check for dependencies, libraries, software routines, and the like that are needed for the client to execute the requested application. When items that must be bundled to the requested application are found, the discovered items can be bundled with the client-optimized application. Moreover, in optional step 245, a determination can be made as to whether the application is to be presented to the client in accordance with a particular delivery format. For example, some clients may prefer or even require that associated software routines, files, etc. to be placed within a designated format, like the JAVA ARCHIVE (JAR) format. When a particular format is specified, the bundling of delivered items can occur in accordance with the specified format. In step 250, the client-optimized application and/or bundle including the client-optimized application can be conveyed to the client.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computerized method for optimizing applications within a deployment server in an on-demand application deployment environment, the method comprising:
    performing a first plurality of application optimizations;
    following performance of the first plurality of application optimizations, receiving by the deployment server a request from a client for an application;
    dynamically analyzing capabilities of a device upon which the client is hosted;
    identifying a generic version of the requested application from a generic application data store that stores at least one generic application written in a device-independent fashion;
    determining whether a client-optimized application exists for the identified generic version of the requested application and the device upon which the client is hosted;
    upon determining that a client-optimized application does not exist for the identified generic version of the requested application and the device upon which the client is hosted, performing the following steps:
matching the client with at least one device profile stored in a profile data store in the deployment server, the matching being based at least in part upon the capabilities of the device upon which the client is hosted;
determining attributes specific to the client based upon the matching device profile; and
dynamically generating at runtime a client-optimized application based upon the determined attributes and the identified generic version of the requested application by building a plurality of scripts based upon the determined attributes, processing the plurality of scripts within an optimizer engine configured to remove unneeded classes, methods, and fields from the identified generic version of the requested application, and iteratively executing the plurality of scripts to perform a second plurality of application optimizations;
identifying at least one software routine that is to be bundled with the client-optimized application so that the client is able to execute the client-optimized application, and creating a bundle including the identified at least one software routine and the client-optimized application, the bundle adhering to any formatting restriction specified by the client; and
conveying the client-optimized application to the client via the bundle.

2. The method of claim 1, wherein the identified generic version of the requested application is a JAVA programming language application, and wherein the client-optimized application includes pre-verified bytecode executables constructed at link time.

3. The method of claim 1, wherein the bundle adheres to the JAVA ARCHIVE (JAR) format.

4. The method of claim 1, wherein the on-demand application deployment environment is part of an integrated development environment, and wherein the integrated development environment creates, tests, and deploys e-business applications to mobile and wireless devices.

5. The method of claim 1, wherein any formatting restriction specified by the client is determined by directly interrogating the client.

6. The method of claim 1, wherein any formatting restriction specified by the client is parsed from the request.

7. The method of claim 1, wherein any formatting restriction specified by the client is determined from profile data stored in the profile data store.

8. A computer program product including machine-readable storage having a set of instructions intended to cause a system having an information processing capability to perform an operation for optimizing applications within a deployment server in an on-demand application deployment environment, the operation comprising:
performing a first plurality of application optimizations;
following performance of the first plurality of application optimizations, receiving by the deployment server a request from a client for an application;
dynamically analyzing capabilities of a device upon which the client is hosted;
identifying a generic version of the requested application from a generic application data store that stores at least one generic application written in a device-independent fashion;
determining whether a client-optimized application exists for the identified generic version of the requested application and the device upon which the client is hosted;
upon determining that a client-optimized application does not exist for the identified generic version of the requested application and the device upon which the client is hosted, performing the following steps:
matching the client with at least one device profile stored in a profile data store in the deployment server, the matching being based at least in part upon the capabilities of the device upon which the client is hosted;
determining attributes specific to the client based upon the matching device profile; and
dynamically generating at runtime a client-optimized application based upon the determined attributes and the identified generic version of the requested application by building a plurality of scripts based upon the determined attributes, processing the plurality of scripts within an optimizer engine configured to remove unneeded classes, methods, and fields from the identified generic version of the requested application, and iteratively executing the plurality of scripts to perform a second plurality of application optimizations;
identifying at least one software routine that is to be bundled with the client-optimized application so that the client is able to execute the client-optimized application, and creating a bundle including the identified at least one software routine and the client-optimized application, the bundle adhering to any formatting restriction specified by the client; and
conveying the client-optimized application to the client via the bundle.

9. The computer program product of claim 8, wherein the identified generic version of the requested application is a JAVA programming language application, and wherein the client-optimized application includes pre-verified bytecode executables constructed at link time.

10. The computer program product of claim 8, wherein the on-demand application deployment environment is part of an integrated development environment, and wherein the integrated development environment creates, tests, and deploys e-business applications to mobile and wireless devices.

11. The computer program product of claim 8, wherein any formatting restriction specified by the client is determined by directly interrogating the client.

12. The computer program product of claim 8, wherein any formatting restriction specified by the client is parsed from the request.

13. The computer program product of claim 8, wherein any formatting restriction specified by the client is determined from profile data stored in the profile data store.

14. A deployment server in an on-demand application deployment environment, the deployment server comprising:
a profile data store configured to store a plurality of attributes for devices and associate different optimization parameters or optimization routines to each of the stored plurality of attributes;
a generic application data store configured to store at least one generic application written in a device independent fashion; and
an optimizer configured to perform a first plurality of application optimizations, receive a request from a requesting device for an application following performance of the first plurality of application optimizations, and, upon determining that no device-specific application exists for the requesting device, determine attributes of the requesting device, utilize the profile data store to identify optimization parameters or optimization routines associated with the attributes of the requesting device, and dynamically generate a device-specific application based upon data from the profile data store and based upon a generic version of the requested application retrieved from the generic application data store by building and processing a plurality of optimization scripts, wherein unneeded classes, methods, and fields are removed from the generic version of the requested application when generating the device-specific application, and wherein the plurality of optimization scripts are executed iteratively such that a second plurality of application optimizations are performed;

an analyzer configured to dynamically analyze capabilities of the requesting device, wherein the analyzed capabilities are translated into the attributes of the requesting device; and a bundler configured to identity machine-readable code to be bundled with the device-specific application in order for the device-specific application to be executable upon the requesting device, and subsequently create a bundle including the identified machine-readable code and the device-specific application, wherein the bundle adheres to any formatting restriction specified by the requesting device, and wherein the bundle is conveyed to the requesting device in response to the request.

15. The deployment server of claim 14, wherein the on-demand application deployment environment is part of an integrated development environment, and wherein the integrated development environment creates, tests, and deploys e-business applications to mobile and wireless devices.

16. The deployment server of claim 14, wherein the generic version of the requested application is a JAVA programming language application, and wherein the device-specific application includes pre-verified bytecode executables constructed at link time.

17. The deployment server of claim 14, wherein any formatting restriction specified by the requesting device is determined by directly interrogating the requesting device.

18. The deployment server of claim 14, wherein any formatting restriction specified by the requesting device is parsed from the request.

19. The deployment server of claim 14, wherein any formatting restriction specified by the requesting device is determined from profile data stored in the profile data store.

* * * * *